Dec. 29, 1953 E. D. GOODALE 2,664,546

ELECTRIC SIGNAL DISTRIBUTION SYSTEM

Filed May 20, 1950 2 Sheets-Sheet 1

INVENTOR
E. Dudley Goodale
BY
Harry Tunick
ATTORNEY

Dec. 29, 1953 E. D. GOODALE 2,664,546

ELECTRIC SIGNAL DISTRIBUTION SYSTEM

Filed May 20, 1950 2 Sheets-Sheet 2

INVENTOR
E. Dudley Goodale
BY Harry Tunick
ATTORNEY

Patented Dec. 29, 1953

2,664,546

UNITED STATES PATENT OFFICE 2,664,546

ELECTRIC SIGNAL DISTRIBUTION SYSTEM

Elmer Dudley Goodale, New Rochelle, N. Y., assignor to Radio Corporation of America, a corporation of Delaware Application May 20, 1950, Serial No. 163,140

2 Claims. (Cl. 333—8)

The invention relates to apparatus for the electrical distribution of television programs.

An object of the invention is to provide a system for distributing television signals at video frequencies, with or without the accompanying sound channels, the system being capable of expansion from a few to many monitoring or receiving points.

Briefly, in accordance with this invention, a television signal distribution system having a multiplicity of output circuits is provided. The apparatus includes an assembly of switches and networks which will enable any one or more of several outputs to be connected to any one of several inputs. The arrangement is such that there is little or no reaction from any one circuit to any other circuit despite the switching operations involved. The electrical panel of the switching apparatus is so designed that the bandwidth of the system is not affected by switching on or adding additional output circuits up to the maximum as will hereinafter be explained more fully.

Figure 1:
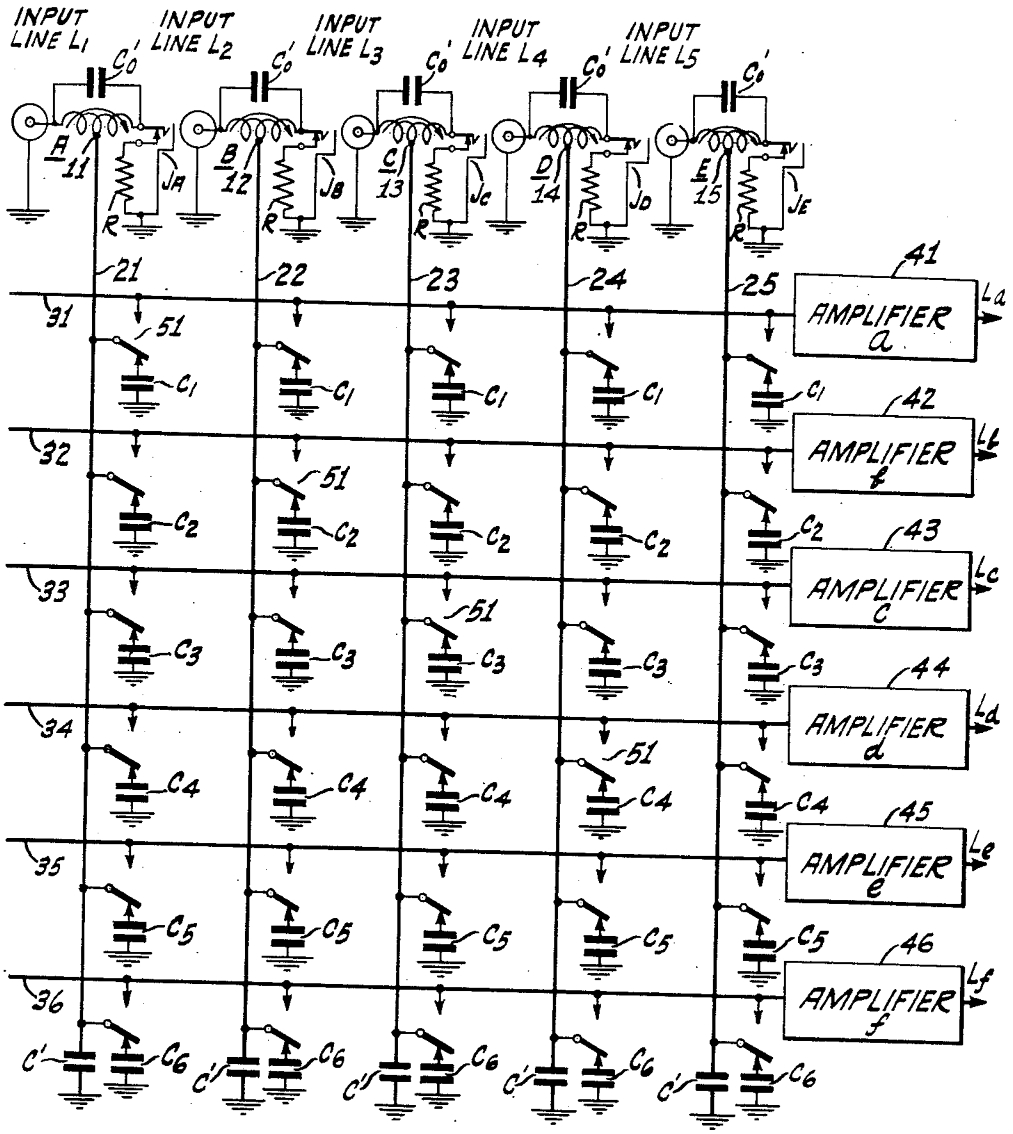
Figure 2:
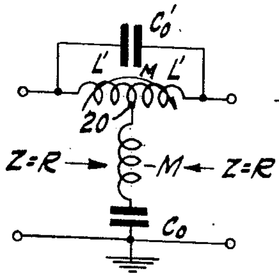

In the accompanying drawing, Fig. 1 is a schematic diagram illustrating the improved television distribution apparatus of the present invention and Fig. 2 is a circuit diagram explanatory of a network utilized in the apparatus of Fig. 1.

Figure 3:
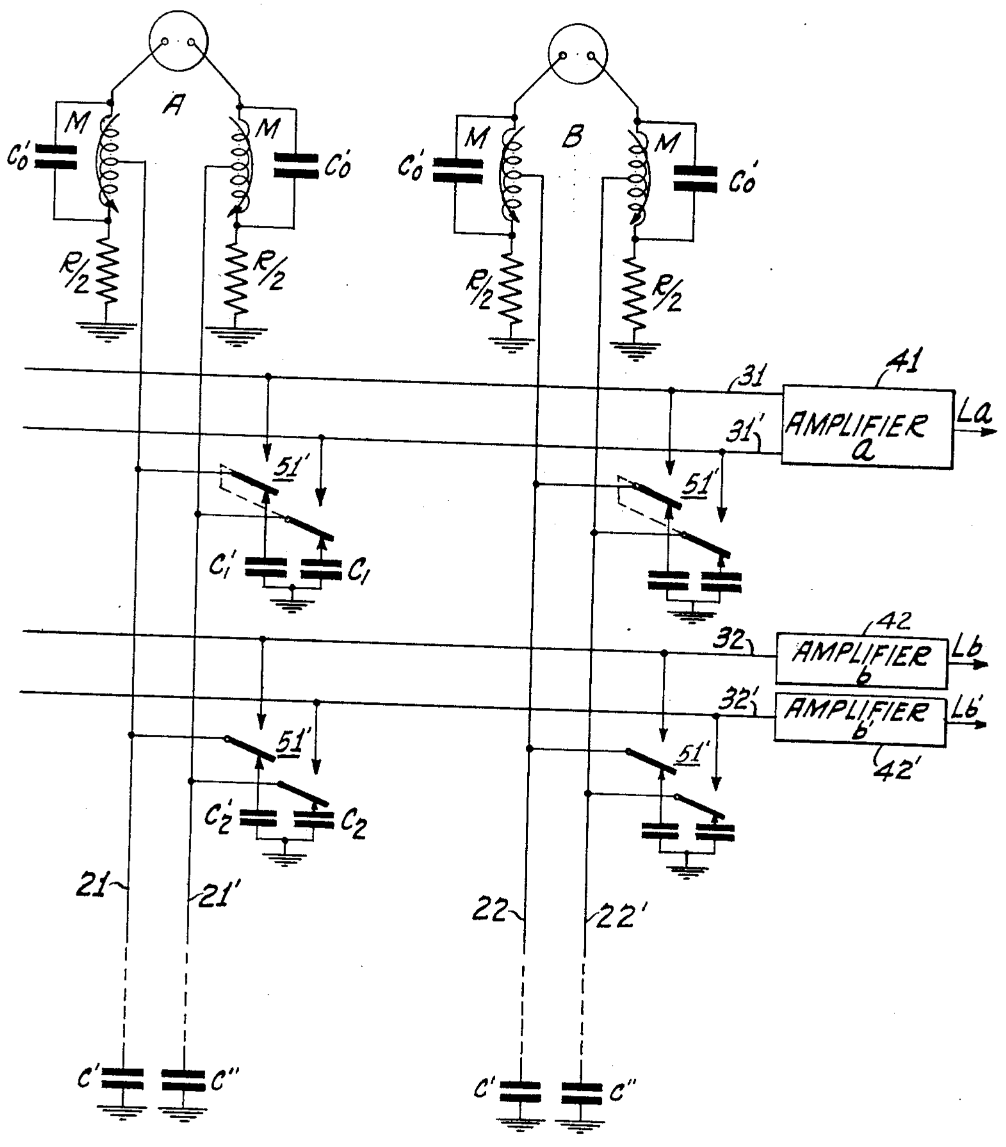

Fig. 3 is a schematic diagram of another embodiment of the improved television distribution apparatus.

Referring to Fig. 1, the arrangement is such that any one of the incoming program lines $L_1$—$L_5$ inclusive may be connected to any one or more amplifiers in outgoing lines $L_a$ to $L_f$ inclusive. The arrangement is such, moreover, that mismatching is avoided and minimized despite the switching.

As shown in Fig. 1 the video distribution and switching system consists of a number of electrical transfer networks A, B, C, D and E inserted in series with each of the incoming program lines $L_1$, $L_2$, $L_3$, $L_4$ and $L_5$. Each of the lines $L_1$ through $L_5$ inclusive carries a different video signal or program. Under the conditions of operation shown in Figure 1, each of the networks is shown terminated in a resistance R equal to the surge impedance of the incoming video line. Inasmuch as the networks present a constant resistance R at their inputs when so terminated, the incoming video lines are consequently terminated in a constant resistance R equal to their surge impedances as is standard transmission practice.

The networks A to E are designed in such a manner that the input and output impedances are constant resistances equal to the surge impedance of the main video feed cables or lines to which they are connected, that the attenuation or loss through the networks is essentially zero, and that the through phase characteristic is reasonably linear to a frequency well above the top frequency required for the distribution system. When the networks are so designed, the transfer transmission characteristics from the inputs to the bridge points 11 to 15 inclusive of Fig. 1 exhibit a reasonably constant amplitude and a reasonably satisfactory phase relation throughout a frequency band approximately 80 per cent of that for which the through phase characteristic is linear.

As shown in Fig. 2, the foregoing characteristics will be obtained if values are given to the various elements of the networks as follows:

$$L=\frac{.158R}{f}\times 10^{-6}H \qquad (1)$$

$$M=\frac{-.030R}{f}\times 10^{-6}H \qquad (2)$$

$$C_0=\frac{.315}{Rf}\times 10^{-12}F \qquad (3)$$

$$C_0'=\frac{.029}{Rf}\times 10^{-12}F \qquad (4)$$

Where R equals the surge impedance in ohms of the video feed cable and $f$ equals the frequency in megacycles per second to which linear phase transmission through the networks is desired.

Practically speaking, the negative inductance −M shown in Fig. 2 is obtained by center tapping a single layer coil having inductive coupling between its two halves as shown in Fig. 1. The capacitor $C_0$ is connected to this center tap. The capacity of this capacitor $C_0$ it will be noted is equal to the sum of the capacities of the capacitors $C_1$, $C_2$, $C_3$ etc. The mutual inductance coupling between the two parts of the center tapped coil reflects a negative inductance into the center tap lead when the fields of the two coupled coils are aiding one another. If the two coils were so wound that their fields were opposing one another than the reflected inductance would be positive instead of negative.

In other words the arrangement of the center tapped inductances of each of the networks shown in Fig. 1 is the electrical equivalent of the three inductances, L, L and −M of the networks shown in Fig. 2. For the coupled coil combination the self-inductance of each half of the center tapped inductance would be:

$$L'=\frac{.108R}{f}\times 10^{-6}H \qquad (5)$$

The problem then is to wind a single layer center tapped coil, the self-inductance of each half of which is as caluculated from (5) and the mutual inductance between the two halves of which is as indicated by (2). These can be determined by measuring each half of the coil on an inductance bridge which gives the self-inductance of each half, L'; and then measuring the total inductance from end to end, from which, knowing L', the mutual inductance M can be computed. Since the coils are series aiding and equal $$L_0=2L'+2M=\frac{.31LR}{f}\times 10^{-6}H$$

and the coefficient of coupling $k$ would be $$k=\frac{M}{L'}=46.2 \text{ percent}$$

By juggling wire size, coil form diameter and spacing between turns the above values can be obtained in a single layer center tapped coil. For a more detailed description of this action and adjustment reference is made to U. S. Patent 2,315,784 issued to E. D. Goodale on April 6, 1943.

Connected to the center taps 11 to 15 of each of the inductances of the networks A to E of Fig. 1 are video buses 21 through 25. There are also as shown in Fig. 1 several distribution buses 31 through 36 indicated as heavy horizontal lines, each of which feeds a separate outgoing amplifying circuit designated by the rectangles 41 through 46.

At each of the points where the video and distribution buses would normally intersect, a system of single pole double throw electromagnetically operated switches or relays 51 are employed which removed from the video bus or bridge point 11—15 of each network a capacitor $C_1$, $C_2$, $C_3$, $C_4$, $C_5$, or $C_6$ having a value substantially equal to the input capacity of the corresponding one of the output amplifiers 41 through 46 and its stray distribution bus to ground capacity when that output amplifier is connected onto the particular video bus. The maximum number of output amplifiers which can be connected to a single video bus is determined by the sum of their input capacitors $C_1+C_2+C_3+C_4+C_5+C_6$. This sum, of course, cannot be greater than the value of $C_0$ as determined from (3) less the stray video bus to ground capacity. If it is desired to use fewer than the maximum possible output amplifiers then a capacitor $C_1$ is permanently connected from the video bus to ground. The value of $C_1$ would be the difference between $C_0$ and the sum of the output amplifier capacitors $C_1$, $C_2$, $C_3$, etc., plus the stray video bus to ground capacity. Thus it is readily seen that the effective value of the design capacity $C_0$ connected between the center tap of the coil and ground is essentially the same regardless of whether none, one, or all of the output amplifiers are connected to a video bus. Consequently, the network has not been altered by the addition or removal of any one or more of the output amplifiers. Since the voltage variations appearing at the bridge points 11 through 15 are a reasonably true replica of the input voltage variations on lines $L_1$ through $L_5$, the outgoing amplifiers receive a reasonable facsimile of the voltage variations on the incoming video lines $L_1$ through $L_5$.

If, as is sometimes the case, it is desired to work with and from balanced to ground circuits the fundamental arrangement can be laid out as shown in Fig. 3 which is similar to Fig. 1 except that a network is used in each side of the balanced incoming lines $L_1$ through $L_5$. Two video buses for each incoming lines are then used, one for each side of the line, and likewise, two distribution buses for each outgoing circuit. The relays 51 now become those of the double pole double throw variety and the whole panel becomes somewhat more complex but nevertheless workable. The design procedure would be the same as for the first case considering each half of the incoming line as an unbalanced circuit having a surge impedance equal to one-half of that of the balanced line. In many cases due to stray ground currents, interferences, and the like, it may be desirable to work from and into balanced circuits completely.

Another possible method of operation might be that in which the incoming lines were of the balanced type but where the need for carrying the balance throughout the distribution panels is not necessary. In such a case, double the number of output circuits could be obtained, each independent of the others by switching output amplifiers on one side of the video buses only. The differences in polarity of the signal at the outgoing lines $L_a$ through $L_f$ would have to be taken care of by the use of an additional stage of amplification in the outgoing amplifiers "*a*" through "*f*" or the use of balanced output amplifiers from an unbalanced input feed, in which case polarity means nothing since the connections can always be turned over in the plug or connector.

The output coupling amplifiers 41–46 inclusive may be of the balanced or unbalanced variety and may be multi-stage amplifiers. In that event, intercoupling networks between two or more of the stages of the output amplifiers of each output amplifier circuit can be made to have gain characteristics which complement the loss characteristics of the distribution cables or lines being used to transmit the signals to a remote point. Under such conditions a certain degree of equalization by pre-distortion can be effected and the overall signals produced at the receiving locations can be made to be reasonably flat and need little if any further correction. Likewise, these interstage networks can be made to compensate to a limited extent for some deficiencies in the incoming signals received over lines $L_1$–$L_5$ inclusive.

Additional contacts can be provided on the relays to permit the switching of the sound accompanying the various picture programs over separate sound lines to the receiver locations. However, the sound for any program can be modulated onto a carrier just above the highest video frequency required and be made to appear right in the channel by transmitting the sound modulated carrier along with the video program. The correct sound is then automatically transmitted when the switch shown in Fig. 1 is activated. In the case of off-the-air programs, the sound can be derived from the composite signal if an inter-carrier television sound receiver is employed. The sound currents would then automatically appear as part of the composite sound and video signal and would be separated from the picture at the viewing location, just as in the immediately previous case the sound would have to be demodulated from the carrier at the viewing location.

The system as described herein is useful as an antennaplex system for use in apartment houses, hotels, and the like. In that event the various single pole double throw switches 51 may be operated under remote control as for example under push button electromagnetic control from the viewing location or elsewhere.

One particular feature of this invention is that if additional output circuits are required, the whole unit of Fig. 1 can be duplicated easily. Since the networks of Fig. 1 have been designed to have a constant input and output resistance, essentially no loss and a linear through phase characteristic, the signal appearing at the output of the networks has not been appreciably deteriorated. Thus instead of terminating the networks in a resistance R remove the termination and connect on another piece of video cable of the same surge impedance R and run it to another duplicate panel located adjacent to or remote from the first. This cable would come into the second panel as $L_1$–$L_5$ and would be connected to a similar network which would be terminated in a resistance R if this was the extent of the extension or which would in turn feed another cable to a third panel, etc. The final network in the line, of course, would have to be terminated. Naturally the networks are not as ideally perfect as one might be expected to believe from the above, but with careful attention to details of design and construction, several tandem operations can be carried out effectively. Such an application can be useful in an apartment house or hotel installation where it would be desirable to have such a panel or panels on each floor. The main receiver would then be, say, on the roof or in the basement or some other suitable place and the video cables for each program would be as risers going from floor to floor. On each floor would be several panels as previously indicated, each of which would distribute video signals to rooms or apartments on that floor.

While the invention has been described in terms of express embodiments, it is to be understood that various modifications will be suggested to those skilled in the art without departing from the spirit and scope of the invention.

The invention claimed is:

1. An electric signal distribution system including at least a pair of input terminals for connection to a balanced transmission line of given characteristic impedance, a pair of resistors having resistance values substantially equal to one-half of said characteristic impedance and having given terminals thereof connected together, a pair of networks each comprising a capacitor connected in parallel with a pair of series-connected mutually-coupled inductors individually interconnecting said input terminals to the remaining terminals of said resistors, two input bus conductors forming a balanced transmission line individually connected to the junctions between said inductors, at least two output bus conductors forming another balanced transmission line, at least two single-pole, double-throw switches having blades connected individually to said input bus conductors and given contacts connected individually to said output bus conductors, a number of capacitors of capacity values substantially equal to the input capacities of apparatus to be connected to said output bus conductors connected between the junction of said resistors and the remaining contacts of said switches, and further capacitors connected between said input bus conductors and the junction of said resistors.

2. An electric signal distribution system including a plurality of pairs of input terminals balanced to ground for connecting to balanced transmission lines of given characteristic impedances, a plurality of resistive elements one for each of said input terminals of value substantially equal to one-half of the characteristic impedance of the transmission lines to be connected to the corresponding terminals, a plurality of reactance networks individually interconnecting given ends of said resistive elements and said terminals, the other ends of said resistive elements being connected to ground, said reactance networks having series connected, mutually coupled inductors hunted by a capacitive element, a number of transmission lines each having two conductors balanced to ground and individually connected to the junctions between said inductors, a plurality of transmission lines each having two busses balanced to ground and for connecting to a plurality of load devices having input circuits of predetermined impedance values balanced and unbalanced to ground, a plurality of capacitors having values substantially equal to the input capacities of the associated load devices one for each of said conductors, at least one double-throw switch for each of said conductors for individually and selectively connecting said conductors to said capacitors and said busses, and further capacitors of value substantially equal to the shunt capacity of said reactance networks less the sum of said capacities presented by said switches connected between the junction of the series connected inductors of the reactance network corresponding to the device under consideration and ground.

ELMER DUDLEY GOODALE.

References Cited in the file of this patent

UNITED STATES PATENTS

| Number | Name | Date |
|---|---|---|
| 2,315,784 | Goodale | Apr. 6, 1943 |
| 2,373,458 | Clark | Apr. 10, 1945 |
| 2,394,917 | Kallman | Feb. 12, 1946 |